Patented May 31, 1932

1,860,970

UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, A BRITISH COMPANY

MANUFACTURE OF HOLLOW RUBBER ARTICLES FROM RUBBER OR SIMILAR MATERIALS

No Drawing. Application filed October 2, 1928, Serial No. 309,889, and in Great Britain October 5, 1927.

This invention is concerned with an improved method for manufacturing hollow composite articles of rubber or similar material particularly enemas or other articles having bulbous enlargements.

According to the invention the method consists in dipping a mould consisting of a member such as a tube or rod of, for instance glass or stainless steel and provided with a bulbous enlargement of rubber or similar material having a roughened surface and approximating to the shape of the article to be formed thereon into a concentrated and/or compounded dispersion of or containing rubber or similar material, then drying the coating on the mould and, if necessary, vulcanizing it, and subsequently removing the tube or rod while leaving the bulbous enlargement of rubber or similar material as an integral part of the finished article.

The concentrated and/or compounded dispersions may consist of natural or artificial dispersions of rubber, gutta percha, balata or other vegetable resins or a mixture of the same. If desired the dispersions may be prevulcanized. Concentrates prepared as described in specification No. 232,705 are particularly suitable for carrying out the method of this invention. These and equivalent substances of whatever origin or composition are herein generically designated as "rubber material".

The dipping may be repeated as often as is necessary to secure the desired thickness of deposit. If desired the mould with its deposit may be partially dried between each dipping or the mould may be introduced between each dipping into a heated dehydrating and setting medium such as a heated solution of, for instance, calcium chloride or ammonium acetate to increase the setting of the deposit. If desired the mould may be immersed in water between the dippings in the dispersion and dehydrating and setting medium. In order to facilitate the adherence of the coating the bulbous enlargement of rubber is preferably buffed and advantageously provided with a thin layer of latex prior to being dipped into the dispersion.

What we claim is:—

1. A method of manufacturing articles having bulbous enlargements which comprises forming a roughened surface on a bulbous element of rubber material of approximately the shape of the bulbous part of the article to be formed, mounting said element on tubular members, dipping said bulbous element and said tubular members into a dispersion of rubber material, drying the resulting coating of rubber material and subsequently removing the tubular extensions while leaving the bulbous element as an integral part of the finished article.

2. A method of manufacturing hollow articles having a bulbous enlargement which consists in forming a roughened surface on a rubber element of bulbous form and approximating the shape of the bulbous enlargement of the finished article, providing said roughened surface with a coating of rubber latex, mounting tubular extensions on said bulbous element, dipping said element and extensions into a dispersion of rubber material, drying the resulting coating and subsequently removing the tubular elements while leaving the bulbous element as an integral part of the finished article.

3. A method of manufacturing hollow composite articles having bulbous enlargements which consists in forming a roughened surface on a bulbous rubber element, mounting said element with tubular extensions, dipping said bulbous element and extensions into a dispersion of rubber material, dipping said bulbous element and extensions with their coatings into a heated dehydrated setting medium, repeating said dipping until a sufficiently thick deposit has been formed, and subsequently removing the tubular extensions while leaving the bulbous element as an integral part of the finished article.

In witness whereof, we have hereunto signed our names.

DOUGLAS FRANK TWISS.
EDWARD ARTHUR MURPHY.